US009493030B2

(12) United States Patent
Valencia

(10) Patent No.: US 9,493,030 B2
(45) Date of Patent: Nov. 15, 2016

(54) PEN SUPPORT RACK HAVING BIOMETRIC ACCESS RESTRICTION

(71) Applicant: Isamar Valencia, Los Angeles, CA (US)

(72) Inventor: Isamar Valencia, Los Angeles, CA (US)

( * ) Notice: Subject to any disclaimer, the term of this patent is extended or adjusted under 35 U.S.C. 154(b) by 0 days.

(21) Appl. No.: 14/599,832

(22) Filed: Jan. 19, 2015

(65) Prior Publication Data

US 2016/0207348 A1 Jul. 21, 2016

(51) Int. Cl.
*A47F 7/00* (2006.01)
*G06K 9/00* (2006.01)
*B43M 99/00* (2010.01)

(52) U.S. Cl.
CPC .......... *B43M 99/008* (2013.01); *A47F 7/0021* (2013.01); *G06K 9/00013* (2013.01); *G06K 9/00087* (2013.01)

(58) Field of Classification Search
CPC ............. A47F 7/0021; B43M 99/008; G06K 9/00013; G06K 9/00087
USPC ........... 211/4, 65, 66, 69.1, 69.2, 69.3, 69.4, 211/69.5, 69.6, 69.7, 69.8, 69.9; 340/5.52, 340/5.53, 5.7, 5.82, 5.83; 70/275, 276, 277, 70/278.1
See application file for complete search history.

(56) References Cited

U.S. PATENT DOCUMENTS 875,064 A 12/1907 Graves
2,965,238 A 12/1960 Sinclair
3,162,313 A 12/1964 Aimes
3,178,031 A 4/1965 Aimes
5,701,770 A * 12/1997 Cook ...................... E05B 47/02 206/1.5
5,934,499 A * 8/1999 van der Hoven ........ A45B 3/00 220/475
6,018,739 A 1/2000 McCoy
6,307,956 B1 10/2001 Black
6,317,044 B1 * 11/2001 Maloney ............ G07C 9/00896 340/5.9
7,423,515 B1 * 9/2008 Fiske .................. E05B 47/0002 340/5.2
8,353,187 B2 * 1/2013 Woodling ........... E05B 47/0603 70/20
2004/0255623 A1 * 12/2004 Sun .................... G07C 9/00563 70/38 A
2005/0151620 A1 * 7/2005 Neumann .......... G06K 9/00006 340/5.52
2007/0013478 A1 * 1/2007 Crigger ................ A47B 81/005 340/5.53
2007/0126551 A1 * 6/2007 Slevin ..................... E05B 67/00 340/5.53
2010/0071423 A1 * 3/2010 Dehaan ............... E05B 73/0005 70/58
2013/0255335 A1 * 10/2013 Jonely ................. E05B 47/0001 70/277

* cited by examiner

*Primary Examiner* — Joshua Rodden
(74) *Attorney, Agent, or Firm* — The Keys Law Firm PLLC

(57) ABSTRACT

A pen support rack for securing pens and preventing unauthorized access comprises a support member defining a rack body having a base, a trunk, and a plurality of branches and an integrated fingerprint scanner. Each branch includes a locking loop for receiving the body of a conventional pen, with its clip secured over the loop so that the pen hangs from the locking loop. Each locking loop is operative to selectively lock a pen inside through operation of an integrated electromagnet. Thus when an authorized user seeks to secure a pen to the pen support rack or remove one from the pen support rack, the user would place his finger on the fingerprint scanner. If the fingerprint is accepted by the fingerprint scanner, a signal is sent to the microcontroller causing it to toggle the provision of electricity to the electromagnets on the locking loops.

4 Claims, 1 Drawing Sheet

PEN SUPPORT RACK HAVING BIOMETRIC ACCESS RESTRICTION

BACKGROUND OF THE INVENTION

Field of the Invention

This invention relates generally to support racks and, more particularly, to a writing implement support rack with an integrated fingerprint access restriction.

Description of the Prior Art

The use of writing utensils. such as pens, is well known. Even as people use mobile computers more and more, using a pen and paper still remains a daily part of life in environments such as schools, colleges, offices, hospitals and clinics. A problem which still exists, however, is that many often have a difficult time keeping track of their pens; whether it be because others borrow/take them or because typical storage arrangements are often simply throwing the pen in a desk or other receptacle in which it is easily lost. Thus, there remains a need for a pen support rack that can receive and hold a plurality of pens for storage and which includes access restriction technology. It would be helpful if such a pen support rack employed a biometric access restrictor so as to not require the use of passwords. It would be additionally desirable for such a pen support rack to be structured as a decorative object so that it could be displayed on a desk or other furniture.

The Applicant's invention described herein provides for a pen support rack adapted to restrict access to pens being held to authorized users. The primary components in Applicant's pen support rack are a support member and an access restrictor. When in operation, the pen support rack enables the effective storage of pens in plain sight while restricting access to the stored pens to authorized users. As a result, many of the limitations imposed by the prior art are removed.

SUMMARY OF THE INVENTION

A pen support rack for securing pens and preventing unauthorized access. In the preferred embodiment, the pen support rack comprises a support member with an integrated fingerprint scanner. The support member defines a rack body having a base, a trunk, and a plurality of branches. Near the end of each branch is a locking loop that is sized to receive the body of a conventional pen that includes an integrated clip, with the clip of the pen secured over it so that the pen hangs from the locking loop. Each locking loop is operative to selectively lock a pen inside through operation of an integrated electromagnet. Thus when an authorized user seeks to secure a pen to the pen support rack or remove one from the pen support rack, the user would place his finger on the fingerprint scanner. If the fingerprint is accepted by the fingerprint scanner, a signal is sent to the microcontroller causing it to toggle the provision of electricity to the electromagnets on the locking loops.

It is an object of this invention to provide a pen support rack that can receive and hold a plurality of pens for storage and which includes access restriction technology.

It is another object of this invention to provide a pen support rack that employs a biometric access restrictor so as to not require the use of passwords.

It is yet another object of this invention to provide a pen support rack structured as a decorative object so that it could be displayed on a desk or other furniture.

These and other objects will be apparent to one of skill in the art.

DETAILED DESCRIPTION OF THE INVENTION

Figure 1A:
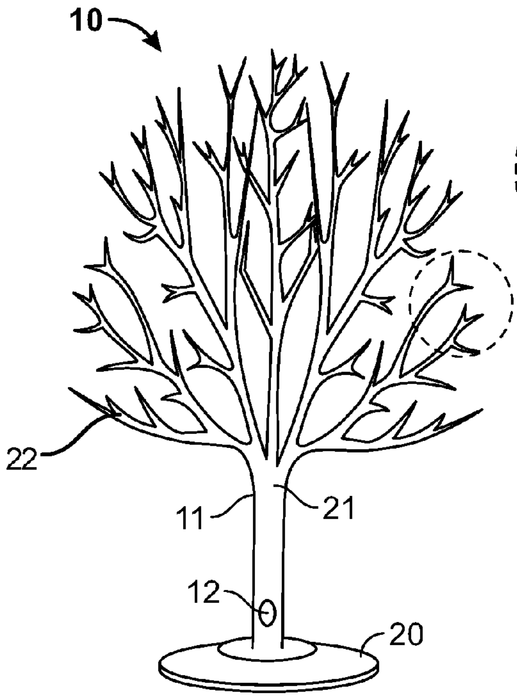
FIG. 1A is a front elevational view of a pen support rack built in accordance with the preferred embodiment of the present invention.
Figure 1B:
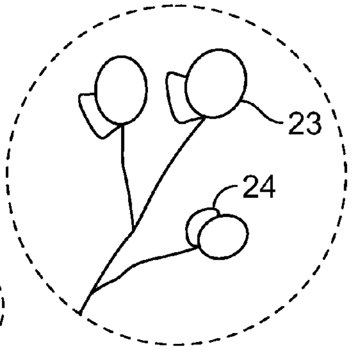
FIG. 1B is an exploded sectional view of a portion of the pen support rack shown in FIG. 1A.
Figure 2:
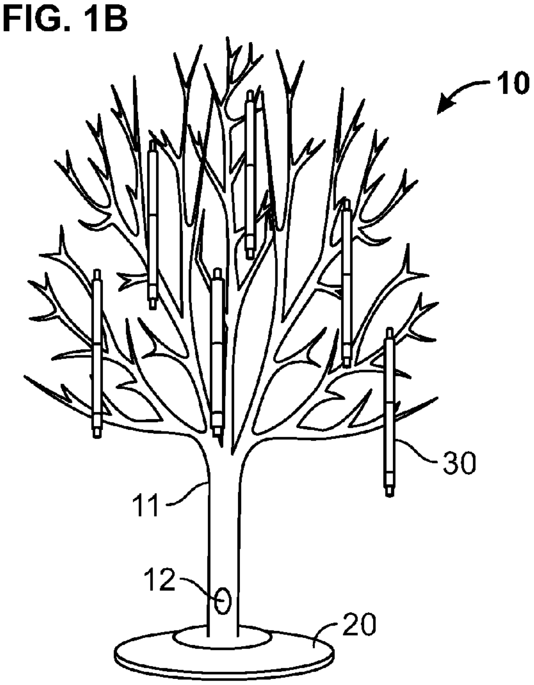
FIG. 2 is a front elevational view of a pen support rack built in accordance with the preferred embodiment of the present invention with a plurality of conventional pens stored thereon.

Referring now to the drawings and in particular FIGS. 1A, 1B and 2, a pen support rack 10 is shown having a support member 11 with an integrated fingerprint scanner 12. The support member 11 defines a rack body having a base 20, a trunk 21, and a plurality of branches 22. Disposed inside the trunk 21 is a microcontroller and a power source, which are connected together and with the fingerprint scanner 12. In the preferred embodiment, the power source defines an electrical cord that connects to a wall electrical outlet (not shown). Near the end of each branch is a locking loop 23 that is sized to receive the body of a conventional pen 30 that includes an integrated clip, with the clip of the pen 30 secured over it so that the pen 30 hangs from the locking loop 23.

Each locking loop 23 is operative to selectively lock and unlock a pen 30 in place thereon through the operation of an electromagnet. Each locking loop 23 comprises a loop structure that is constructed of a fabric material, such as nylon, having ferromagnetic material, such as pieces of iron alloy, distributed substantially evenly therein. Attached to the loop structure is an electromagnet 24 that is electrically connected with the microcontroller and power source through the branch 22 it extends from. With the microcontroller controlling the provision of electricity to the electromagnet 24, when electricity is supplied to the electromagnet 24 it magnetizes and causes the locking loop 23 to constrict through the attraction of the ferromagnetic material to the electromagnet 24. When electricity is removed from the electromagnet, it loses its magnet force and the locking loop 23 expands back to its normal size.

It is contemplated that the normal size of the locking loop 23 is wide enough to enable a conventional sized pen 30 to be inserted therein. Accordingly, a pen 30 is placed on the locking loop 23 by inserting it through the hole of the locking loop 23 and the securing the clip of the pen to the body of the locking loop 23. When the locking loop 23 constricts by action of the electromagnet 24, the pen 30 becomes fixed in the locking loop 23. By this action, as long as electricity is supplied to the locking loops 23, any pen 30 in place in one of said locking loops 23 will be locked therein.

In operation, when an authorized user (one who has his fingerprints stored in the fingerprint scanner 12) seeks to secure a pen 30 to the pen support rack 10 or remove one from the pen support rack 10, the user would place his finger on the fingerprint scanner 12. If the fingerprint is accepted by the fingerprint scanner 12, a signal is sent to the micro-controller causing it to toggle the provision of electricity to the electromagnets 24 on the locking loops 23. The pen support rack 10 is configured to remain in its current state until a signal is generated by the fingerprint scanner 12, so an authorized user touching the fingerprint scanner 12 when the locking loops 23 are locked ceases the provision of electricity to the locking loops 23, unlocking them. This allows pens 30 in place on the locking loops to be lifted off by simply disengaging the pen 30's clip from the locking loop 23. Subsequently, the next time the authorized user touches the fingerprint scanner 12, the provision of electricity to the locking loops 23 resumes and they lock around any pen 30 in place thereon.

It is contemplated that a metallic clip on the pen would additionally contribute to securing the pen 30 in place when the electromagnet 24 is powered on, providing a supplemental source of attachment of the pen 30 in the locking loop 23.

Figure 3:
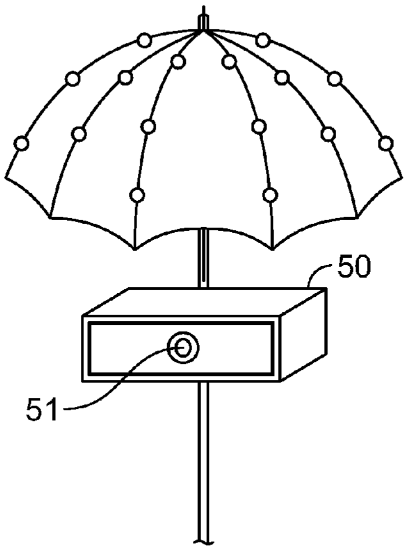
FIG. 3 is a front perspective view of a pen support rack built in accordance with a drawer embodiment of the present invention.
Figure 4:
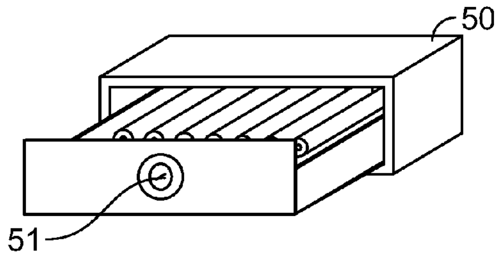
FIG. 4 is a front perspective view of the drawer of a pen support rack built in accordance with the drawer embodiment of the present invention.

Referring now to FIGS. 3 and 4, in an alternate, drawer embodiment embodiment of the present invention, the locking loops are replaced with a drawer 50 that includes an integrated fingerprint scanner 51. In this embodiment, the drawer 50 is locked and unlocked by a conventional electromagnet through a substantially similar protocol as the preferred embodiment, with the drawer 50 selectively locking and unlocking through an authorized user pressing the fingerprint scanner 51.

It is understood that in alternate embodiments, alternate access restriction technologies, such as manually entered passwords or eye scanning or other biometric devices, may be employed in the alternative to or in addition to the fingerprint scanner The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A pen support rack for selectively locking pens to prevent unauthorized access, comprising:

a support member having at least one securing component, wherein the securing component is operative to receive the body of a conventional pen and selectively move between an unlocked state wherein a pen received by the securing component is removable from the securing component and a locked state wherein a pen received by the securing component is locked therein;

a biometric scanner integrated with the support member and configured to toggle the at least one securing component between the unlocked state and the locked state;

wherein the at least one securing component defines a discrete locking loop having an integrated electromagnet and said support member includes a power source and microcontroller in communication with said electromagnet; and wherein said locking loop defines a loop structure that is constructed of a fabric material having ferromagnetic material distributed substantially evenly therein.

2. The pen support rack of claim 1, wherein the biometric scanner defines a fingerprint scanner.

3. The pen support rack of claim 1, wherein said fabric material defines nylon and said and said ferromagnetic material defines pieces of iron alloy.

4. The pen support rack of claim 1, wherein said locking loop is operative to move between the unlocked state and the locked state through the provision and removal of electricity from the power source to the respective electromagnet.

* * * * *